May 13, 1952
W. J. SOCKELL
2,596,301
AUTOMATIC BRAKE SLACK ADJUSTER FOR
RAILROAD CAR BRAKE RIGGINGS
Filed Feb. 24, 1950
2 SHEETS—SHEET 2
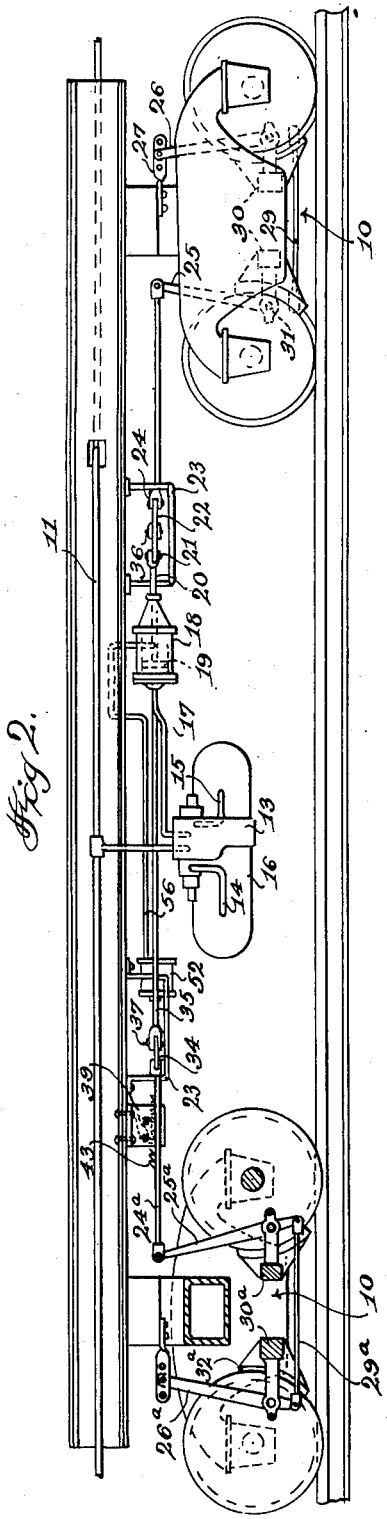
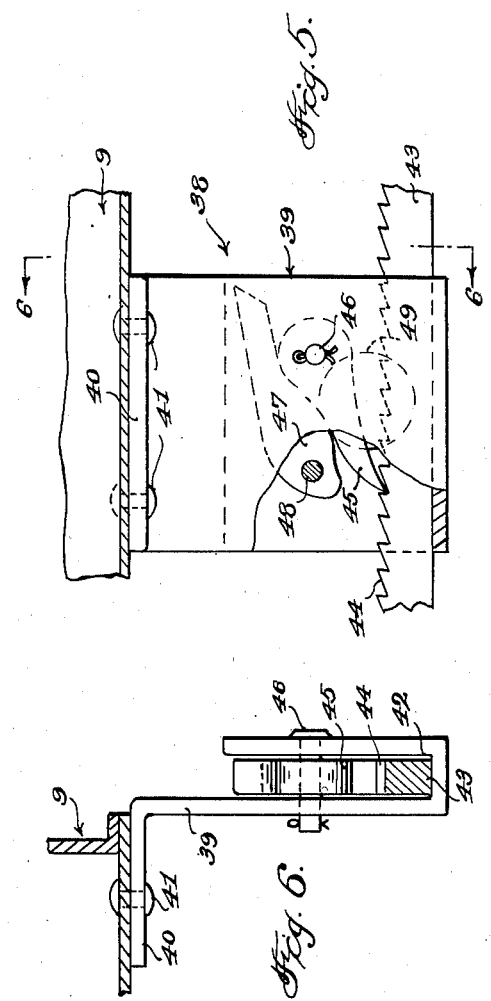
Inventor
William J. Sockell
By John N. Randolph
Attorney Patented May 13, 1952

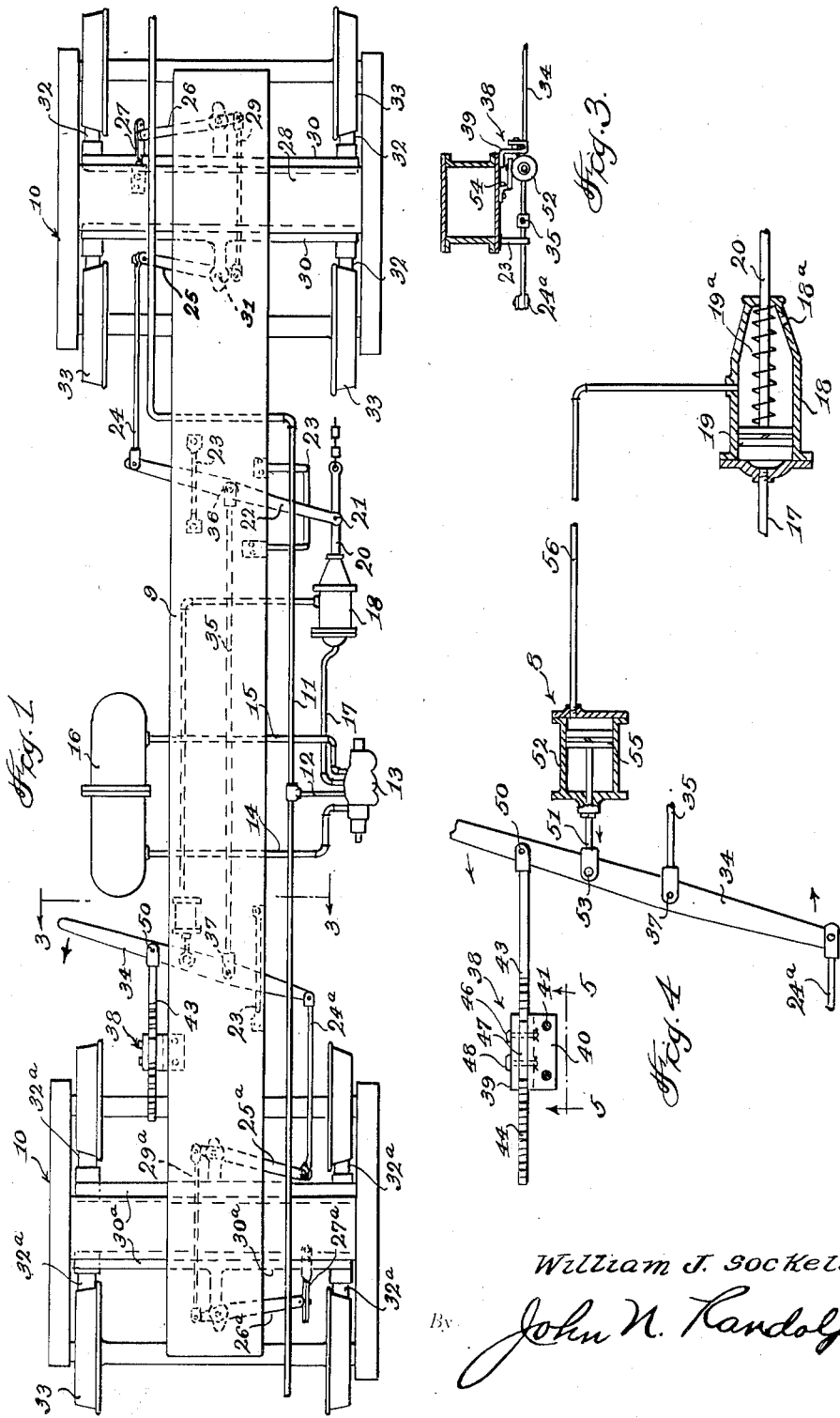

2,596,301

UNITED STATES PATENT OFFICE 2,596,301

AUTOMATIC BRAKE SLACK ADJUSTER FOR RAILROAD CAR BRAKE RIGGINGS

William J. Sockell, Raleigh, N. C.

Application February 24, 1950, Serial No. 145,933

4 Claims. (Cl. 188—200)

This invention relates to an attachment for use with a conventional air brake rigging of a railroad car, particularly a freight car, to provide an automatic slack adjusting means for taking up slack in the brake unit of each car truck resulting from wear on the brake shoes automatically whenever the piston travel of a brake cylinder exceeds a predetermined distance for constantly and automatically maintaining the brakes in proper operating adjustment.

The present invention is primarily distinguished from prior devices for automatically adjusting the brakes of freight cars in that the brake adjustor is operated by direct connection with the air brake cylinder of the car rather than being directly connected to the air brake line thus eliminating additional valves and regulating apparatus otherwise required and positively preventing inadvertent application of the brakes in an emergency position.

Still a further object of the invention is to provide an automatic brake adjustor which may be readily released manually when brake shoes are replaced and which will thereafter effect proper adjustment for the new brake shoes.

Still another object of the invention is to provide an automatic brake slack adjusting apparatus of extremely simple construction involving a minimum of parts and which may be quickly and easily mounted on a railroad car and connected operatively to the brake rigging thereof.

Various other objects and advantages of the invention will hereinafter become more fully apparent from the following description of the drawings, illustrating a presently preferred embodiment thereof applied to a conventional air brake rigging of a railroad car, and wherein:

Figure 1 is a top plan view of the undercarriage of a freight car illustrating a conventional air brake rigging and showing the automatic brake slack adjustor applied thereto;

Figure 2 is a longitudinal sectional view, partly in side elevation thereof;

Figure 3 is a cross sectional view taken substantially along a plane as indicated by the line 3—3 of Figure 1;

Figure 4 is an enlarged fragmentary plan view, partly in section, illustrating the automatic brake slack adjustor and certain of the parts associated therewith;

Figure 5 is an enlarged fragmentary side elevational view, partly in section of a portion of the automatic slack adjustor, taken substantially along a plane as indicated by the line 5—5 of Figure 4, and Figure 6 is a cross sectional view thereof taken substantially along a plane as indicated by the line 6—6 of Figure 5.

Referring more specifically to the drawings for the purpose of illustrating a preferred application and use of the automatic brake slack adjustor, designated generally 8 and comprising the invention, a part of the undercarriage of a freight car and the brake rigging thereof has been illustrated in the drawings including a center sill 9 which is conventionally supported adjacent its ends on the car trucks, designated generally 10. The conventional air line 11 of the air brake system extends longitudinally of the center sill and is suitably supported thereby or by other parts of the car, not shown. The air line 11 has a branch 12 which is connected to a triple valve 13, of conventional construction. Two conduits 14 and 15 extend between the triple valve 13 and the end of a reservoir 16, one end of which reservoir constitutes the service part and the other end of which constitutes the emergency section. An air line 17 leads from one end of the triple valve 13 to one end of a brake cylinder 18. The triple valve 13, reservoir 16 and brake cylinder 18 may be supported in any conventional manner on the railroad car. The brake cylinder 18 contains a reciprocating piston 19 having a piston rod 20 which projects therefrom reciprocally through the end of the cylinder 18, located remote to the air line 17. The piston rod 20, beyond the last mentioned end of the cylinder 18 is pivotally connected at 21 to one end of a lever 22 which extends generally transversely beneath the center sill 9 and which is supported therebeneath for swinging and sliding movement by conventional yoke members 23, the ends of which are secured to the center sill 9 and the intermediate portions of which are downwardly offset with respect thereto to provide supports on which the lever 22 rests. A pull rod 24 is pivotally connected at one of its ends to the opposite end of the lever 22 and is pivotally connected at its other end to the upper end of the live lever 25 of one of the trucks 10. A dead lever 26 of said truck 10 is pivotally connected at its upper end to a bracket 27 which is fastened to the truck bolster 28 and which has spaced openings, as seen in Figure 2 for adjusting the pivot point of the lever 26. The levers 25 and 26 extend downwardly at an incline so that their lower ends are disposed substantially centrally of the center sill 9 and said lower ends of the levers 25 and 26 are connected by a bottom rod 29 which is pivotally connected to each of said levers.

Each of the levers 25 and 26 is pivotally connected near its lower end to a transversely disposed brake beam 30, intermediate of the ends of said brake beam and by an extension 31 thereof. Each brake beam carries a brake shoe 32 on each end thereof and the shoes of each brake beam are arranged to engage transversely aligned wheels 33 of the truck 10 when the pull rod 24 is displaced from right to left of Figure 1 and which causes the brake beams 30 to be displaced away from one another in a conventional manner for applying the brakes or for displacing the four brake shoes 32 into engagement with the four truck wheels 33.

The other truck 10 at the left of Figure 1 has a corresponding brake unit including a pull rod 24a, live lever 25a, dead lever 26a, bracket 27a, bottom rod 29a, brake beams 30a, and brake shoes 32a. A lever 34 is supported beneath the center sill 9 and substantially transversely thereof by a yoke member 23, in the same manner as the lever 22 and is pivotally connected at one of its ends to the other end of the pull rod 24a. A connecting rod 35 extends longitudinally beneath the center sill 9 and has one end pivotally connected at 36 to the intermediate portion of the lever 22 and its opposite end pivotally connected at 37 to the intermediate portion of the lever 34. The parts previously described are all of conventional construction and have been illustrated and described merely to afford a better understanding of the brake slack adjustor 8.

The usual stationary pivot or fulcrum for the lever 34 is omitted and replaced by a part of the automatic slack adjustor 8, which part includes an adjustor unit, designated 38 and which substantially corresponds in construction to my prior U. S. Patent 2,495,990 to which reference is made for a more complete disclosure. The adjustor unit 38 as best illustrated in Figures 5 and 6 includes a bracket 39 having a horizontal flange 40 which is secured by fastenings 41 to the center sill 9 to support the bracket 39 in a depending position with respect thereto. The bracket 39 defines an upwardly opening channel 42 through which a rack bar 43 slidably extends. The upwardly facing teeth of the rack bar 43 are all inclined in the same direction as seen at 44 and toward the lever 34. A pawl 45 is pivotally mounted in the channel of the bracket 39 on a pin 46 and has its free end disposed to engage between two of the teeth 44 and is held in engagement therewith by a tumbler 47 which is pivotally mounted in the bracket 39 on a pin 48 and which bears on the pawl 45. As seen in Figure 5, the rack bar 43 may be displaced from right to left of Figure 5 or of Figure 2, thus in a direction away from the location of the lever 34, as seen in Figures 1 and 2 and in so moving the free end of the pawl 45 will ride over the inclined surfaces of the teeth 44. However, the pawl will positively prevent the rack bar 43 from sliding in the opposite direction unless the pawl 45 is manually raised by inserting the finger through the opening 49 in one wall of the bracket 39 for raising the free end of the pawl out of engagement with the teeth 44. One end of the rack bar 43 is pivotally connected at 50 to the lever 34, near its opposite end and remote to the end thereof which is connected to the pull rod 24a.

The connecting rod 35 is pivoted to the lever 34 substantially intermediate of the pivot 50 and of the pivot of the pull rod 24a to said lever 34.

A piston rod 51, constituting a part of the slack adjustor, extends reciprocally through one end of an adjustor cylinder 52 and has an exposed end pivoted at 53 to the lever 34 intermediate of the pivots 37 and 50. The adjustor cylinder 52 is supported beneath the center sill 9 by a bracket 54, as seen in Figure 3. A piston 55 is reciprocally disposed in the cylinder 52 and is connected to the opposite end of the piston rod 51. A pipe or conduit 56 has one end connected to the cylinder 52 and opens into the end thereof opposite the end through which the piston rod 51 reciprocally extends. The opposite end of the pipe 56 is connected to and communicates with the brake cylinder 18 at a point intermediate of its ends and which is preferably spaced substantially seven and one-half inches from the normal, inoperative position of the piston 19, as illustrated in Figure 4. The piston 19 is normally held in its inoperative position by a spring 19a, constituting a part of the conventional brake rigging and the cylinder 18 is provided with a vent port 18a, likewise constituting a conventional part thereof and which is disposed near the end of the cylinder, remote to the end thereof to which the pipe 17 is connected.

When the air brakes are normally applied by operation of the triple valve 13, in a conventional manner and under control of the engineer, air is admitted to the line 17 exerting a pressure on the piston 19 for displacing it from left to right of Figure 4. The normal travel of the piston 19 in applying the brakes is less than seven and one-half inches so that the end of the pipe 56 which connects with the brake cylinder 18 is not exposed by travel of the piston 19 therebeyond. When the piston 19 is thus moved from left to right the lever 22 is caused to rock on the pivot 36 as a fulcrum in a counterclockwise direction as seen in Figure 1 for applying the brakes of the right-hand truck 10, as previously described. However, through the connecting rod 35 the brakes of the left-hand truck 10 are likewise simultaneously applied and with the same pressure due to the fact that the lever 22 will also be displaced longitudinally from left to right of Figure 1 as it is rocked counterclockwise for exerting a pull on the lever 34 at the pivot 37 causing said lever to rock counterclockwise on the pivot 50 as a fulcrum and which, in this conventional operation of the brake rigging functions similarly to the normal stationary fulcrum of the lever 34, since the rack bar 43 will be prevented by the pawl 45 from moving from left to right of Figure 1. Accordingly, as the lever 34 rocks counterclockwise on its pivot 50 a pull will be exerted from left to right on the pull rod 24a for similarly applying the brakes of the left-hand truck 10, in the manner as previously described in detail in reference to the brakes of the right-hand truck 10. The preceding description of the operation of the brakes is conventional. However, should the brake shoes 32 or 32a be worn or should either of said sets of brake shoes be worn sufficiently to afford sufficient slack in the brake rigging so that normal air pressure in the line 17 will move the piston 19 a distance greater than seven and one-half inches from its normal, at rest position of Figure 4, this movement of the piston 19 from left to right of Figure 4 for a distance of greater than seven and one-half inches will cause the piston to move beyond and expose the pipe 56 so that air can escape from the brake cylinder 18 to the adjustor cylinder 52. This will cause the piston 55 and piston rod 51 to be displaced from right to left of Figure 4 and when this occurs the lever 34 will be moved from right to left of Figures 1 and 4, carrying with it the rack bar 43 which will slide in the same direction through the bracket 39. The pawl 45 will be displaced upwardly to allow this movement of the rack bar 43 but will prevent said rack bar from moving in the opposite direction so that the fulcrum point 50 of the lever 34 will thus be displaced from right to left of Figure 1 thereby increasing the distance between the fulcrum points 21 and 50 to take up the slack in the brake rigging since this will tend to displace the end of the lever 34 which is connected to the pull rod 24a from left to right of Figure 1 which will displace the connecting rod 35 in the opposite direction due to the fact that the lever 34 will then be disposed more nearly crosswise of the center sill 9. This displacement of the connecting rod 35 from right to left of Figure 1 will cause the lever 22 to be rocked counterclockwise on its pivot 21 for taking up slack in the brake unit of the right-hand truck 10 by the pull thus exerted on the pull rod 24. After this adjustment has been accomplished the unit 38 will retain the parts in their adjusted positions and the air will then escape back through the pipe 56 to the cylinder 18, normally before the brakes are "knocked off" and the piston 19 commences its movement to the right and back to its position of Figure 4 or, in any event, the air may escape through the vent port 18a, so that the piston 55 and piston rod 51 are normally disposed for free sliding movement in the adjustor cylinder 52 and thus will not interfere with the normal swinging movement of the lever 34 in the application or release of the brakes. After the brake shoes have been worn sufficiently to require replacement, the pawl 45 is manually raised, as previously described, and the end of the lever 34 beyond and adjacent the pivot 50 is grasped as a handle for swinging said lever to the right or clockwise as seen in Figure 1 and with the rack bar 43 moving in the same direction, after which when the brakes are initially applied the automatic brake adjustor 8 will initially function to automatically obtain a correct initial adjustment.

Various modifications and changes are contemplated and may obviously be resorted to, without departing from the spirit or scope of the invention as hereinafter defined by the appended claims.

I claim as my invention:

1. An automatic brake slack adjustor for a railroad car comprising, in combination with an air brake rigging of a railroad car including a brake cylinder responsive to air pressure in the air line connected to an end of the brake cylinder for rocking link connected levers for applying the brakes of the four wheels of each truck of a railroad car; a rack bar pivotally connected at one of its ends to one lever of the brake rigging and forming the normal stationary pivot of said lever, a bracket reciprocally supporting said rack bar, a pawl mounted pivotally in said bracket for engaging the rack bar teeth, said rack bar teeth being inclined all in one direction for free sliding movement of the rack bar through said bracket in one direction, said pawl holding the rack bar against movement relatively to the bracket in the opposite direction, an adjustor cylinder supported by a part of the railroad car, a piston reciprocally disposed in the adjustor cylinder, a piston rod fixed to and extending from said piston reciprocally through one end of the adjustor cylinder and pivotally connected to said lever between the rack bar pivot and the link connection to said lever, and an air pipe extending from the opposite end of the adjustor cylinder to the intermediate portion of the brake cylinder, the brake piston being normally disposed in the brake cylinder between the connections of the air line and the air pipe to said brake cylinder and being movable beyond the connection of the air pipe to the brake cylinder when the brakes are applied and an excess amount of brake slack exists whereby compressed air from the train air line will pass through the brake cylinder and air pipe to the adjustor cylinder for moving the adjustor cylinder piston and piston rod to a projected position to displace the lever connected to said piston rod away from the adjustor cylinder for taking up the brake slack and for moving the rack bar through its supporting bracket in said first mentioned direction of movement.

2. An automatic brake slack adjustor for air brake riggings of railway cars comprising a rack bar, means for reciprocally supporting said rack bar for sliding movement in a direction longitudinally of a railroad car, a pawl supported by said means and engaging the teeth of the rack bar to permit free sliding movement of the rack bar in one direction relatively to said means and to prevent sliding movement of the rack bar in the opposite direction, one end of said rack bar being pivotally connected to a first brake rigging lever which is adapted to operate the brakes of one truck of the car and which is connected to a second brake rigging lever for operating the brakes of the other car truck by a longitudinally extending connecting rod, an adjustor cylinder supported by the car between said brake rigging levers, a piston reciprocally mounted in the adjustor cylinder, a piston rod fixed to and projecting from said piston reciprocally through one end of the adjustor cylinder and having an outer end pivotally connected to said first brake lever between the points of connection of the connecting rod and rack bar to the first brake rigging lever, an air line extending from the opposite end of the adjustor cylinder and adapted to be connected to the intermediate portion of a brake cylinder containing a piston and a piston rod which is connected to said second brake lever beyond one end of said brake cylinder and which brake cylinder is provided with an air inlet from the air line of a car at its opposite end, the piston of said brake cylinder being normally disposed between the brake cylinder air inlet and the connection of the air line to the brake cylinder, the point of connection of the air line to the brake cylinder being spaced from the inoperative position of the brake piston a distance exceeding the distance of normal travel of the brake piston in applying the brakes whereby when the brake piston exceeds its normal travel due to slack existing in the brake rigging said piston will move beyond the point of connection of the air line to the brake cylinder so that air under pressure will flow from the brake cylinder to the adjustor cylinder to project the adjustor cylinder piston for displacing the first brake lever away from the adjustor cylinder, said rack bar sliding freely through said means relatively to the pawl when the first brake lever is displaced away from the adjustor cylinder and said pawl preventing movement of the rack bar in the opposite direction and movement of the pivot point of the rack bar and first brake lever toward the adjustor cylinder.

3. An automatic brake slack adjustor as in claim 2, said first lever being connected to its truck brake rigging at the end thereof remote to the pivot of the rack bar to the first lever, the connection of the adjustor cylinder piston rod to said first lever being disposed adjacent the pivot of the rack bar and between said rack bar pivot and the pivot of the truck brake rigging to said lever.

4. An automatic brake slack adjustor as in claim 2, said first lever being connected to its truck brake rigging at the end thereof remote to the pivot of the rack bar to the first lever, the connection of the adjustor cylinder piston rod to said first lever being disposed adjacent the pivot of the rack bar and between said rack bar pivot and the pivot of the truck brake rigging to said lever, the pivot of the connecting rod to the first lever being disposed between the pivots of the adjustor piston rod and the pivot of the truck brake rigging.

WILLIAM J. SOCKELL.

REFERENCES CITED

The following references are of record in the file of this patent:

UNITED STATES PATENTS

| Number | Name | Date |
|---|---|---|
| 1,251,642 | Christenson | Jan. 1, 1918 |
| 1,522,275 | Sauvage | Jan. 6, 1925 |
| 1,825,366 | Sauvage | Sept. 29, 1931 |
| 1,845,070 | Anderson | Feb. 16, 1932 |
| 2,495,990 | Sockell | Jan. 31, 1950 |